United States Patent
Sugisono et al.

(10) Patent No.: US 9,674,083 B2
(45) Date of Patent: Jun. 6, 2017

(54) PATH CALCULATION ORDER DECIDING METHOD, PROGRAM AND CALCULATING APPARATUS

(75) Inventors: Koji Sugisono, Tokyo (JP); Michihiro Aoki, Tokyo (JP); Hideaki Iwata, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 228 days.

(21) Appl. No.: 13/128,771

(22) PCT Filed: Nov. 18, 2009

(86) PCT No.: PCT/JP2009/069538
§ 371 (c)(1),
(2), (4) Date: May 11, 2011

(87) PCT Pub. No.: WO2010/058785
PCT Pub. Date: May 27, 2010

(65) Prior Publication Data
US 2011/0219143 A1 Sep. 8, 2011

(30) Foreign Application Priority Data
Nov. 19, 2008 (JP) ................................. 2008-295532

(51) Int. Cl.
*H04L 12/753* (2013.01)
*H04L 12/721* (2013.01)

(52) U.S. Cl.
CPC .............. *H04L 45/48* (2013.01); *H04L 45/12* (2013.01)

(58) Field of Classification Search
None
See application file for complete search history.

(56) References Cited

U.S. PATENT DOCUMENTS 4,987,536 A * 1/1991 Humblet ............... G06F 15/173
370/256
5,321,815 A * 6/1994 Bartolanzo, Jr. ....... H04L 45/48
340/2.1
(Continued)

FOREIGN PATENT DOCUMENTS

JP 2005-159846 A 6/2005
JP 2006-197473 A 7/2006

OTHER PUBLICATIONS

E.W. Dijkstra, "A Note on Two Problems in Connexion with Graphs", Numerische Mathematik 1, Jun. 11, 1959, pp. 269-271.
(Continued)

*Primary Examiner* — Sulaiman Nooristany
(74) *Attorney, Agent, or Firm* — Carrier Blackman & Associates, P.C.; Joseph P. Carrier; Jeffrey T. Gedeon (57) ABSTRACT

A path calculation order determining method executed by a calculating apparatus for calculating a shortest path between a node pair in a network, using information on calculated shortest paths between other node pairs, the method including: a step storing calculated shortest path group information on shortest path groups each including calculated shortest paths from a starting node to one or more terminating nodes except the starting node, and topology information of the network, in a memory medium; and a calculation step of calculating shortest paths, starting from its starting node other than the starting node on the calculated shortest paths and having the most nodes that are located downstream therefrom, and terminating at nodes other than its starting node, using the calculated shortest path group information or the topology information for a path not included in the calculated shortest path group.

3 Claims, 6 Drawing Sheets

(56) References Cited

U.S. PATENT DOCUMENTS

| 7,765,319 B1* | 7/2010 | Gorman | H04L 41/12 370/351 |
| 2006/0146733 A1* | 7/2006 | Alicherry et al. | 370/255 |
| 2009/0313596 A1* | 12/2009 | Lippmann | G06F 17/505 716/126 |

OTHER PUBLICATIONS

Koji Sugisono et al., "Kosoku na Cost Sakugen Multi Cast Keiro Keisanho no Kento", ("Study on fast steiner tree calculation algorithm"), IEICE Technical Report, Nov. 20, 2003, vol. 103, No. 442, pp. 51-54, NS2003-156.

* cited by examiner

FIG.4 path (S→E)

FIG.5

Manage to sort by use of the number of downstream nodes

FIG.6

Select the node having the most nodes located downstream

FIG.7

For the calculation of the trees starting from node "c", the part of the calculation result is just used. For the calculation of the shortest path to the remaining node, path calculation algorithm is used.

FIG.8

Manage to sort by use of the number of downstream nodes

FIG.9

Select the node having the most nodes located downstream
→Calculate about path tree starting from node "D"

PATH CALCULATION ORDER DECIDING METHOD, PROGRAM AND CALCULATING APPARATUS

FIELD OF INVENTION

Present invention is related to a path calculation order deciding method, a program and a calculating apparatus, in particular, a path calculation order deciding method, a program and a calculating apparatus which decide, by use of calculated shortest path between a node pair, path calculation order in calculating shortest path between other node pair.

BACKGROUND

When a change occurs about nodes, paths between nodes and the laying situation (topology) of the network link in the network, data may go through a point through which cannot be gone before the change, or data may not go through a point through which can be gone before the change.

When it is necessary to always know a shortest path from a starting node to a terminating node, with a change of the topology of the path, it is necessary to calculate again the shortest path from the starting node to the terminating node in the topology after the change.

The conventional shortest path calculating apparatus is configured to calculate again each shortest path between a node pair by using topology information representing topology after the change. In "A Note on Two Problems in Connexion with Graphs" (E. W. Dijkstra, Jun. 11, 1959, Numerische Mathematik 1, p269-271), a method to calculate again each shortest path between a node pair by using topology information is mentioned.

When a shortest path between a predetermined node pair is already calculated, there is a case that there is a common part (called "common part" as follows) between this calculated shortest path between a node pair and shortest path between other node pair which is to be calculated.

When there is the common part, this common part can be used as a part of the calculation result for calculation of the shortest path between the node pair which is to be calculated.

In particular, when a part representing shortest path between the node pair from starting point to terminating point which is to be calculated (called "part path" as follows) is included in the calculated shortest path between the node pair, this part path is equal to shortest path between the node pair which is calculated.

If a group of shortest paths consisting of each calculated shortest path between the pair of nodes includes a lot of part paths, calculation time of each shortest path between the node pair which is to be calculated is shortened by use of this calculated group of shortest paths.

Conventionally, there is no technology to shorten calculation time of each shortest path between the node pair by paying attention to this point (If a group of shortest paths consisting of each calculated shortest path between the node pair includes a lot of part paths, calculation time of each shortest path between the node pair which is to be calculated is shortened by use of this calculated group of shortest paths.).

A purpose of the present invention is to provide a path calculation order deciding method, a program and a calculating apparatus which decide calculation order of the shortest path between the node pair in order to shorten calculation time of shortest path between other node pair by use of each calculated shortest path between the node pair.

According to the present invention, in a decreasing order of the numbers of the paths which can be just used when each shortest path between other node pair is calculated, each shortest path between other node pair can be calculated. Therefore, calculation time of each shortest path between other node pair can be shortened.

The present invention is a path calculation order determining method that is executed by a calculating apparatus, to calculate a shortest path between other node pair by use of information of calculated shortest paths between node pairs in a network including a plurality of nodes, the method including: a step of storing calculated shortest path group information about calculated shortest paths which are calculated shortest paths starting from an identical node and terminating at nodes other than the starting node, and also storing topology information on topology of the plurality of nodes in the network, in a memory medium included in the calculating apparatus; and a calculation step of calculating a shortest path between a node pair, which has, as its starting node, a node other than the starting node of the calculated shortest paths and having the most nodes located downstream therefrom on the calculated shortest paths, and has, as its terminating node, each node of the plurality of nodes other than its starting node, by use of the calculated shortest path group information and the topology information.

The present invention is a system that includes a processor and a non-transitory computer readable medium for storing program instructions, calculated shortest path group information on calculated shortest path groups each of which includes shortest paths starting from an identical starting node and terminating at nodes other than the starting node, and topology information on topology of nodes in a network including a plurality of nodes. The instructions include a calculation step of calculating a shortest path between a node pair, which has, as its starting node a node other than the starting node of the calculated shortest paths and has the most nodes located downstream therefrom on the calculated shortest paths, and has, as its terminating node, each node of the plurality of nodes other than its starting node, by use of the calculated shortest path group information and the topology information.

The present invention is also a calculating apparatus for determining a path calculation order to calculate a shortest path between a node pair by use of calculated shortest paths in a network including a plurality of nodes. The apparatus includes: a memory medium storing calculated shortest path group information on calculated shortest path groups each of which includes shortest paths starting from an identical node and terminating at nodes other than the starting node, and also storing topology information on topology of the plurality of nodes in the network; and a calculation unit executing a calculation step of calculating a shortest path between a node pair, which has, as its starting node, a node other than the starting node of the calculated shortest paths and has the most nodes located downstream therefrom on the calculated shortest paths, and has, as its terminating node, each node of the plurality of nodes other than its starting node, by use of the calculated shortest path group information and the topology information.

In addition, it is preferable that the calculation step includes steps executed by the calculating apparatus of: a search step of searching every node located one-hop downstream from the starting node on the paths included in the calculated shortest path group as calculation starting nodes; a selection step of selecting a node as a particular calculation starting node having the most nodes that are located downstream therefrom among; the calculation starting nodes a shortest path calculation step of calculating a shortest path starting from the particular calculation starting node and terminating at each of nodes other than the particular calculation starting node by use of the calculated shortest path group information for nodes on a path that are included in the calculated shortest path group, or the topology information for nodes on paths that are not included in the calculated shortest path group; and a repetition step of adding the searched node by the searched step as the calculation starting node, and repeating the search step, the selection step and the shortest path calculation step, until the calculation of every shortest path starting from each of the calculation starting nodes is over.

BRIEF DESCRIPTION OF DRAWINGS

For a more complete understanding of the present invention and the advantages thereof, reference is now made to the following description taken in conjunction with the accompanying drawings wherein.

DETAILED DESCRIPTION

With reference to the drawings will be described embodiments of the invention in detail below.

Figure 1:
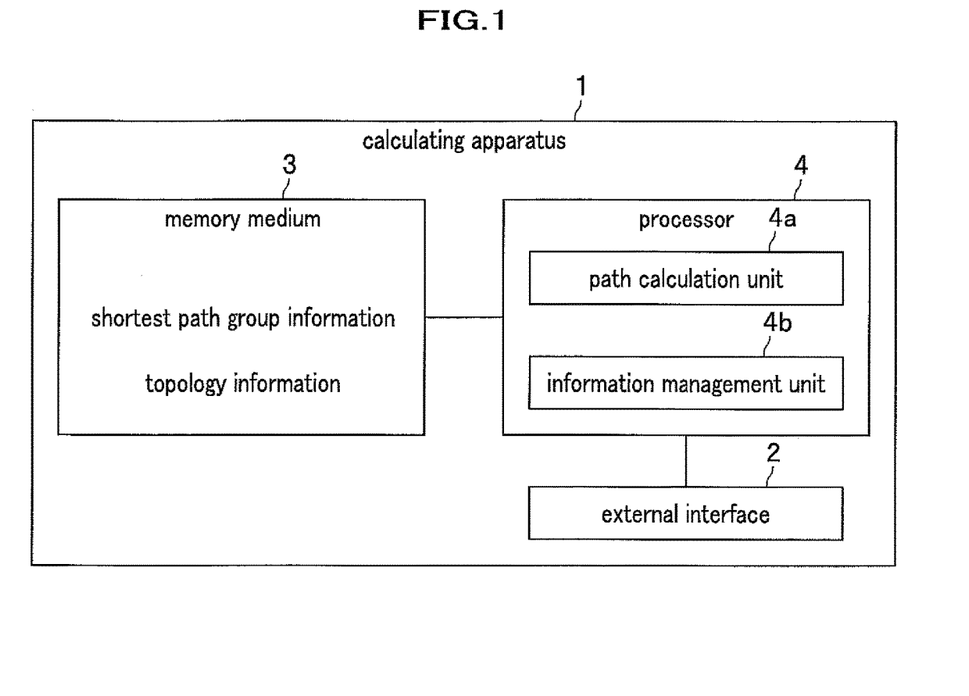
FIG. 1 is a block diagram showing structure of a calculating apparatus 1 in an embodiment of the present invention.

FIG. 1 is a block diagram showing structure of the calculating apparatus 1 in an embodiment of the present invention.

The calculating apparatus 1 comprises an external interface 2, a memory medium 3 and a processor 4.

The external interface 2 transmits to other devices (non-illustration) calculation results of the shortest paths each of which is shortest path between a node pair and receives information about the topology (called "topology information" as follows) from other devices.

The memory medium 3 is an example of the memory means, and the recording medium which can be read by a computer.

For example, the memory medium 3 stores shortest path group information (information about group of shortest paths) and the topology information. The shortest path group information includes calculated shortest paths whose starting nodes are identical and terminating nodes are different from one another.

The shortest path group information represents calculated shortest paths each of which is shortest path between the node pair, whose starting nodes are identical and terminating nodes are different from one another, with a plurality of nodes and the paths between the nodes.

In this embodiment, in shortest path group information, calculated shortest paths each of which is shortest path between the node pair, whose starting nodes are identical and terminating nodes are different from one another, are constituted by the tree nodes which are on a tree path between the starting node and the terminating node in accordance with the tree, and links between the node pairs. In addition, illustration of the topology of the network is omitted, but paths between the nodes which are near each other exist.

There are arrows in the tree. Each arrow connects a predetermined node with adjacent node (a one-hop upstream node or a one-hop downstream node). In addition, each arrow is oriented from upstream to downstream.

Figure 2:
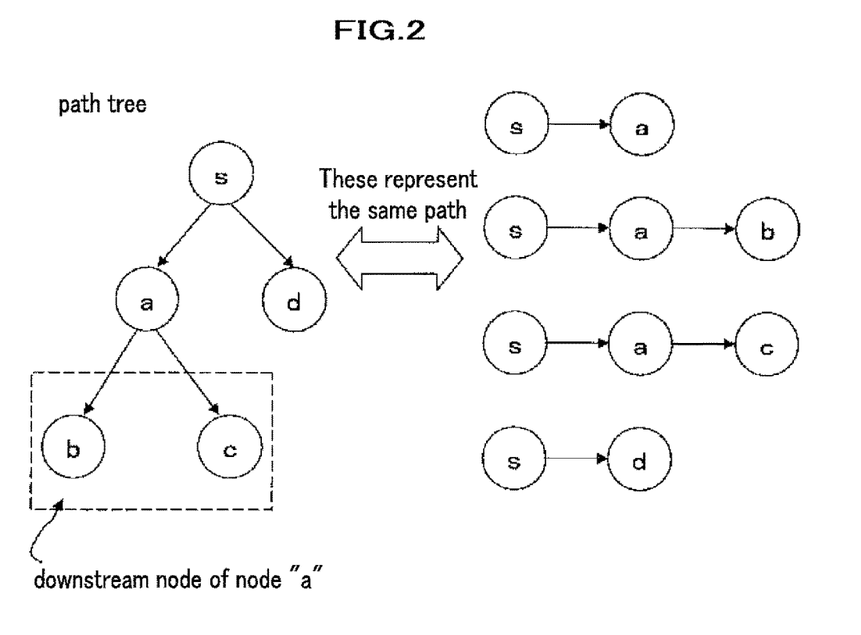
FIG. 2 is a figure for explanation showing an example of the path tree of the group of shortest paths.

Supposing that there is a tree shown in FIG. 2 for the group of shortest paths whose starting node are identical, the shortest path from node s to node b is shown like s→a→b along the tree. Likewise, the shortest path from node s to node a, c, d are shown like s→a, s→a→c, s→d along the tree. In addition, in the tree, the starting point is disposed at the top of the tree, and the nodes which are near the terminating node are arranged downstream.

In the following, a node which is located on the path same as a predetermined node and is located nearer the starting point than the predetermined node is called "upstream node", and a node which is located on the path same as the predetermined node and is located nearer the terminating point than the predetermined node is called "downstream node".

Topology information represents topology for a plurality of nodes in the shortest path group information.

The processor 4 is an example of the calculation means. The processor 4 comprises a path calculation unit 4a and an information management unit 4b.

In addition, when the memory medium 3 stores program for process of the processor 4, the processor 4 functions as the path calculation unit 4a and the information management unit 4b by reading the program from the memory medium 3 and carrying it out.

The path calculation unit 4a reads the shortest path group information and topology information from the memory medium 3.

The path calculation unit 4a selects each particular node of the plurality of nodes in the shortest path group information, which is different from the starting node, in decreasing order of the numbers of the downstream nodes from the particular node in calculated shortest paths between the node pairs represented by the shortest path group information.

The path calculation unit 4a calculates, in response to each selection of the particular node, the shortest path between the node pair, which has, as its starting point, the selected particular node and has, as its terminating point, other each node of the plurality of nodes in the shortest path group information, by use of calculated shortest path between other node pair and the topology information.

In this embodiment, the path calculation unit 4a implements the search processing (search step) and the selection processing (selection step) and the shortest path calculation processing (shortest path calculation step) and the repetition processing (repetition step).

In the search step, the path calculation unit 4a searches every node located one-hop downstream from the starting node in each calculated shortest paths between the node pairs represented by the shortest path group information, as calculation starting node which belongs to the particular node.

In the selection step, the path calculation unit 4a selects the particular calculation starting node having the most downstream nodes from the calculation starting node in calculated shortest paths between the node pairs in the shortest path group information among the calculation starting nodes, as a particular calculation starting node.

In the shortest path calculation step, the path calculation unit 4a calculates shortest path between the node pair, which has, as its starting point, the selected particular calculation starting node and has, as its terminating point, other each node of the plurality of nodes in the shortest path group information, by use of calculated shortest path between other node pair and the topology information.

In the repetition step, the path calculation unit 4a repeats a series of processing that, about all the particular node in the shortest path group information, the calculation unit searches every node located one-hop downstream from the particular calculation starting node in calculated shortest paths between the node pairs represented by the shortest path group information, and adds the searched node as the calculation starting node, and implement the search step and the selection step and the shortest path calculation step, until the calculation of shortest path between the node pair, which has, as its starting point, the particular node and has, as its terminating point, other each node of the plurality of nodes in the shortest path group information is over.

The information management unit 4b performs the update processing and acquisition processing about the calculated path information and the topology information.

Next, processing will be described.

Figure 3:
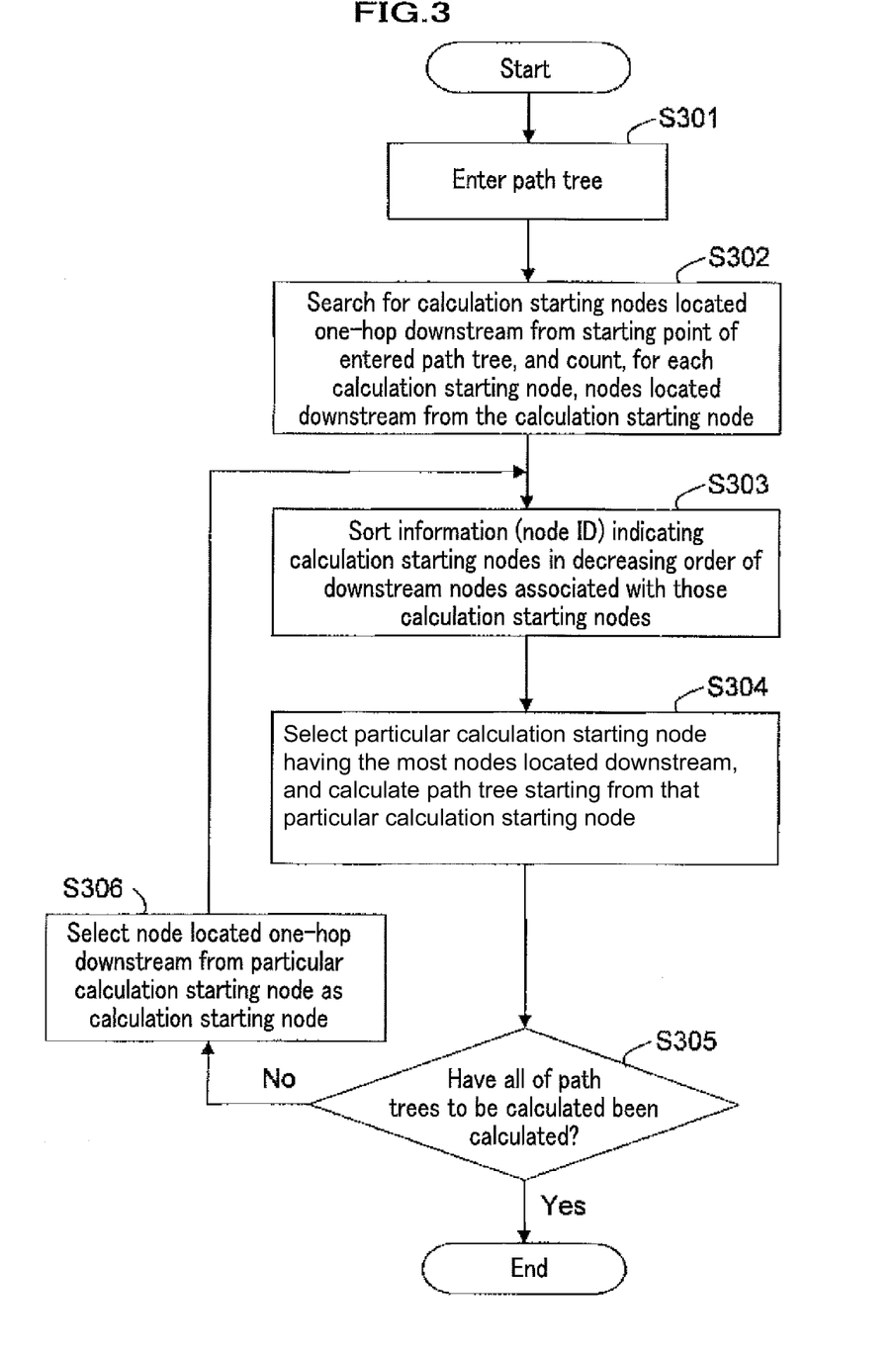
FIG. 3 is a flow chart to explain processing of the calculating apparatus 1.
Figure 4:
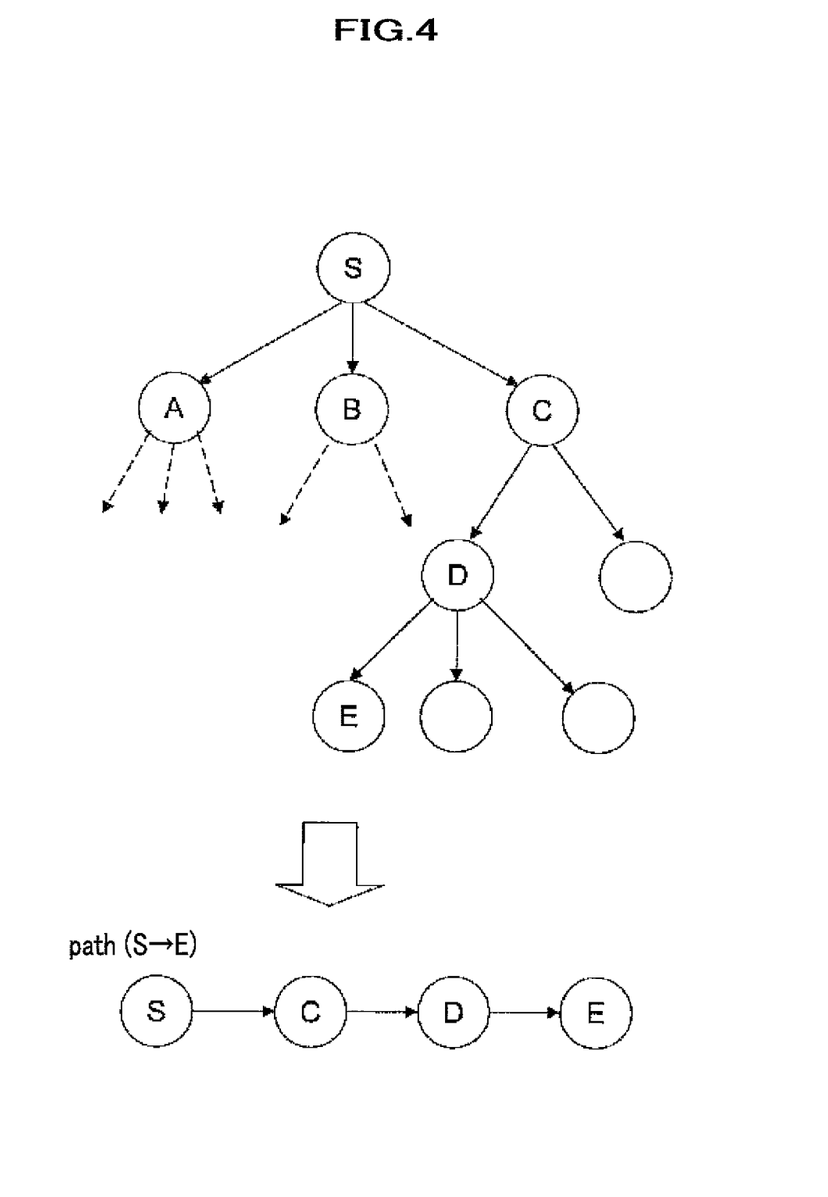
FIG. 4 is a figure to explain processing of the calculating apparatus 1.

FIG. 3 is a flow chart to explain processing of the calculating apparatus 1.

In addition, in this embodiment, the calculating apparatus 1 determines the calculation order of the shortest path at calculating each shortest path by calculating shortest paths between the node pairs, whose starting nodes are identical and terminating nodes are different from one another by one process, and changing the starting node into other nodes.

At first, the path calculation unit 4a receives shortest path group information which represents calculated shortest paths each of which is shortest path between the node pair (path tree), which have the same starting node, and topology information by reading the shortest path group information and topology information from the memory medium 3 (S301). The group of shortest paths is expressed in tree structure shown in FIG. 2 by shortest path group information.

Next, the path calculation unit 4a searches for a node (calculation starting nodes) located one-hop downstream from starting point about group of shortest paths represented in form of tree structure. And the path calculation unit 4a counts, for each calculation starting node, the number of nodes located downstream from the calculation starting node in each calculated shortest path between the node pair of the shortest path group information, and associates the number of nodes with calculation starting node (S302).

Next, the path calculation unit 4a sorts information (for example, node ID (IDentification)) indicating calculation starting nodes in decreasing order of the numbers of downstream nodes associated with the calculation starting nodes (S303).

Next, the path calculation unit 4a selects a node (particular calculation starting node) having the most downstream nodes therefrom among the calculation starting nodes. And at next process, the path calculation unit 4a calculates shortest path between the node pair, which has, as its starting point, the selected node (particular calculation starting node) and has, as its terminating point, other each node in tree structure, by use of calculated shortest path between other node pair (for example, shortest path group information) and the topology information (S304).

Next, the path calculation unit 4a judges whether about all the node except starting node among plurality of nodes in the shortest path group information, calculation of each shortest path between the node pair, which has, as starting node, the node and has, as terminating node, respective other nodes was over. (S305).

When about all the node except starting node among plurality of nodes in the shortest path group information, calculation of shortest paths between the node pairs, which have, as starting node, the node and have, as terminating node, respective other nodes is not over (S305, No), the path calculation unit 4a searches every node located one-hop downstream from the particular calculation starting node in calculated shortest paths between the node pairs represented by the shortest path group information, and adds the searched node as the calculation starting node. Next, the path calculation unit 4a counts, for each added calculation starting node, the number of nodes located downstream from the calculation starting node in calculated shortest paths between the node pairs of the shortest path group information, and associates the number of nodes with calculation starting node (S306).

Next, the path calculation unit 4a returns to processing of S303.

On the other hand, when about all the node except starting node among plurality of nodes in the shortest path group information, calculation of shortest paths between the node pairs, which have, as starting node, the node and have, as terminating node, respective other nodes was over (S305, Yes), the path calculation unit 4a finishes processing (S305, Yes).

Next, each step will be described with reference to FIGS. 4-9.

Like the above, in the following, paths are shown by tree structure. In the case of tree structure shown in FIG. 4, the shortest path from node S to node E is shown with S→C→D→E.

At first, S301, S302 and S303 will be described with reference to FIG. 5.

Figure 5:
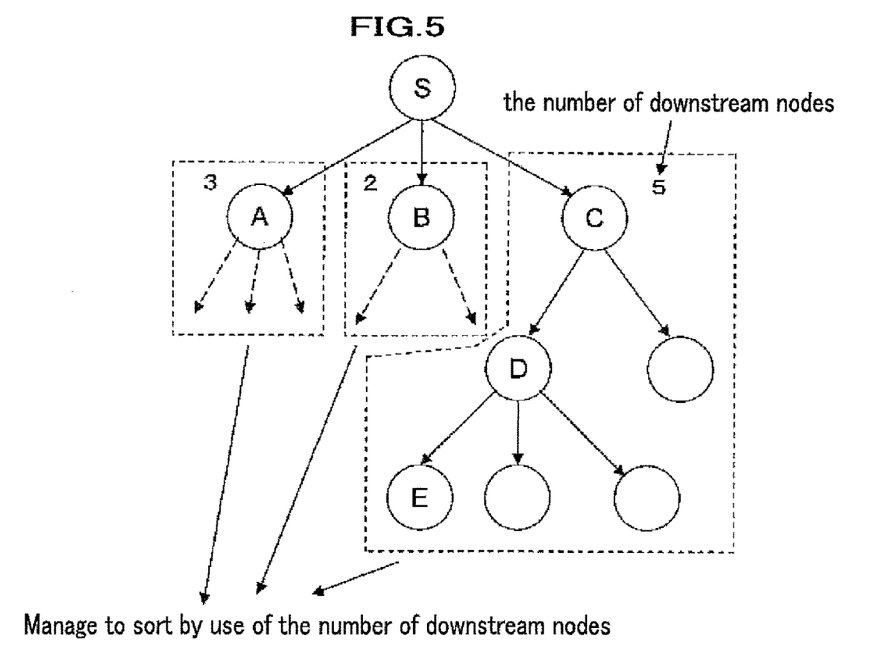
FIG. 5 is a figure to explain processing of the calculating apparatus 1.

When the plurality of shortest paths between the node pairs, which have, as its starting node S and have, as its terminating point, other each node of the plurality of node shown in FIG. 5 were calculated, the path calculation unit 4a calculations about node A, B, C which are located one-hop downstream from node S which is the starting point.

And, the path calculation unit 4a counts the number of the nodes which are located downstream from node A, the number of the nodes which are located downstream from node B, and the number of the nodes which are located downstream from node C. In the case of FIG. 5, there are three nodes in the downstream from node A, there are two nodes in the downstream from node B, there are five nodes in the downstream from node C.

Next, the path calculation unit 4a makes information in which node A and the number of nodes which are located downstream from node A are associated (for example, "node A": "the number of downstream node is 3"). Likewise, the path calculation unit 4a makes information in which node B and the number of nodes which are located downstream from node B are associated, and information in which node C and the number of nodes which are located downstream from node C are associated.

The path calculation unit 4*a* manages the information in the form by which the path calculation unit 4*a* can take out the information of node having the most downstream nodes therefrom from the information. For an example of the management, there is a method that the information is gotten into a heap memory, and is managed.

Figure 6:
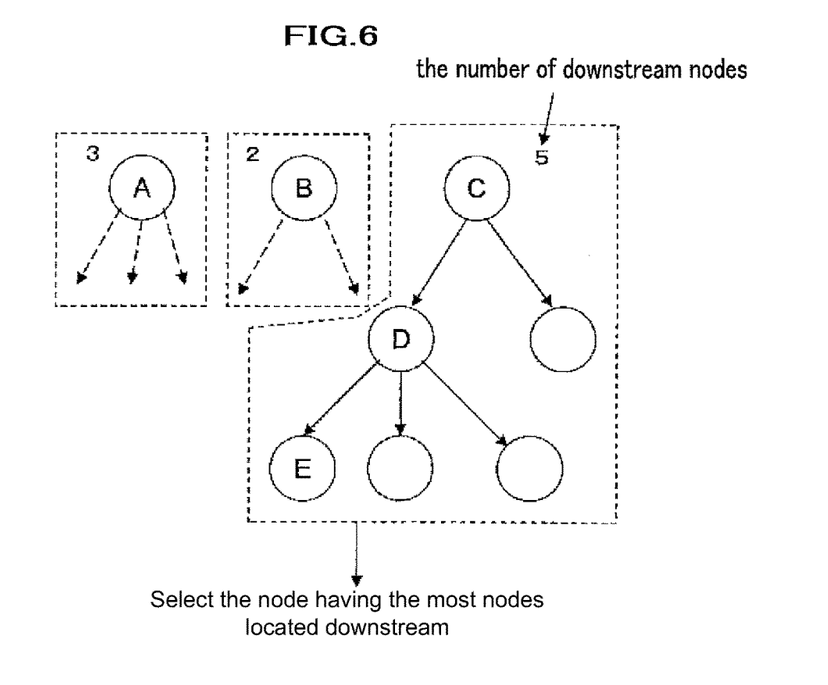
FIG. 6 is a figure to explain processing of the calculating apparatus 1.

Next, S304 will be described with reference to FIG. 6, 7.

The path calculation unit 4*a* takes out the information of node having the most downstream nodes therefrom from information managed by S303. In the example of FIG. 6, since node which has the most downstream nodes therefrom is node C, the path calculation unit 4*a* takes out information about node C.

Figure 7:
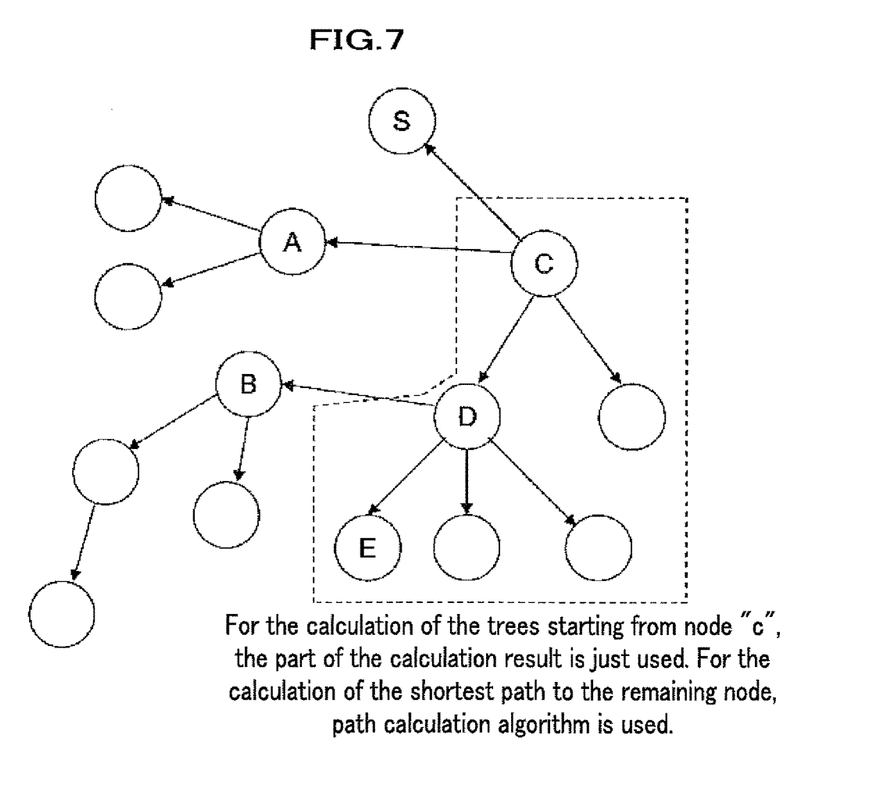
FIG. 7 is a figure to explain processing of the calculating apparatus 1.

Next, The path calculation unit 4*a* calculates the shortest path starting from node C as shown in FIG. 7.

In this case, the path calculation unit 4*a* calculates the shortest path starting from node C by use of the calculation result of shortest path starting from the node (in this example, node S) located upstream from node C in calculated shortest paths between the node pairs.

For example, when the path calculation unit 4*a* calculates the tree part starting from node C as shown in FIG. 5 in shortest paths between the node pairs, which have, as its starting node C and have, as its terminating point, other node, the path calculation unit 4*a* just uses the calculation result about tree part starting from node C in the calculation result of shortest path starting from node S.

In addition, in this embodiment, when the path calculation unit 4*a* calculates shortest path which the calculation result of shortest path starting from node S does not include, in shortest paths between the node pairs, which have, as its starting node C and have, as its terminating point, other node, the path calculation unit 4*a* calculates the shortest path with topology information by use of path algorithm.

The path calculation unit 4*a* keeps the calculation result of the shortest paths, which have, as its starting node C and have, as its terminating point, other node, and uses this calculation result for the calculation of shortest paths which have, as its starting point, other node, performed successively.

Figure 8:
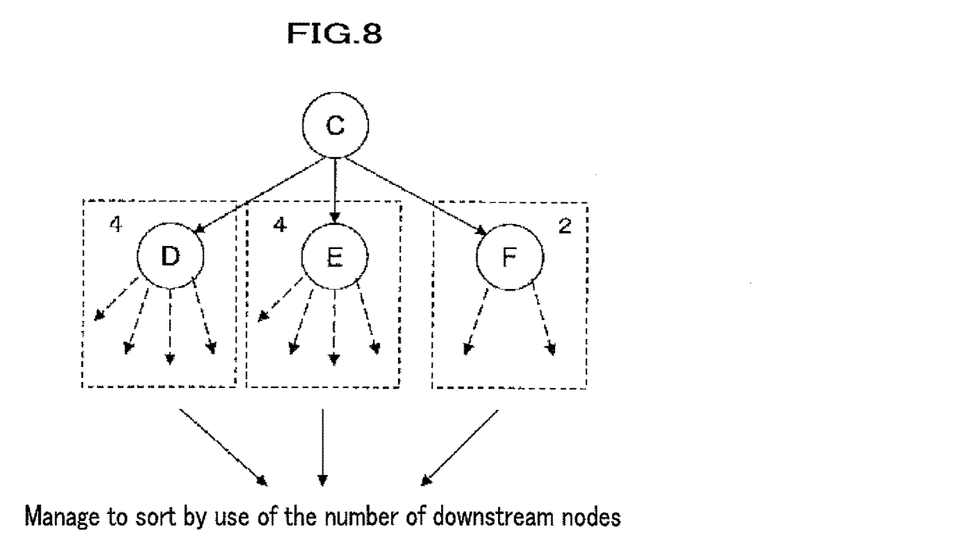
FIG. 8 is a figure to explain processing of the calculating apparatus 1.
Figure 9:
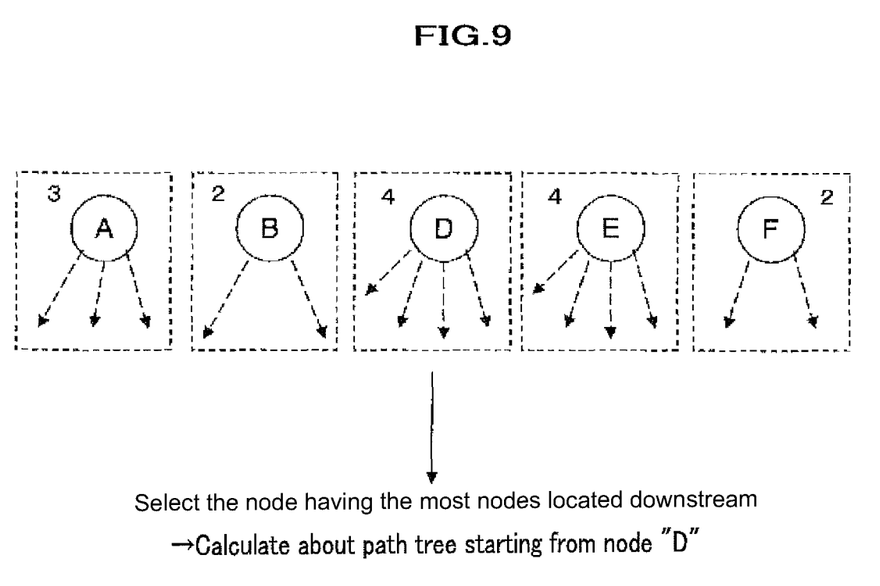
FIG. 9 is a figure to explain processing of the calculating apparatus 1.

When the calculation of shortest paths between the node pairs, which have, as its starting node C and have, as its terminating point, other node was over, the path calculation unit 4*a* calculations about node which are located one-hop downstream from node C, as shown in FIG. 8. And, the path calculation unit 4*a* counts, for each node, the number of nodes located downstream therefrom. The path calculation unit 4*a* makes above information including the number of downstream nodes, and manages the information in the form by which the path calculation unit 4*a* can take out the information of node having the most downstream nodes from the information with information of node A, B which was already made, as shown in FIG. 9. The path calculation unit 4*a* repeats the above processing until all shortest paths are calculated.

Therefore, whenever the path calculation unit 4*a* calculates the shortest path, calculation results which are used when calculation of a shortest path starting from the other nodes is performed successively increase.

In this embodiment, the processor 4 selects particular nodes of the plurality of nodes, which are different from the starting node, in decreasing order of the numbers of the downstream nodes from the particular node in calculated shortest paths between the node pairs represented by the shortest path group information, and calculates, in response to each selection of the particular node, the shortest path between the node pair, which has, as its starting point, the selected particular node and has, as its terminating point, other each node of the plurality of nodes, by use of calculated shortest path between other node pair and the topology information.

Therefore, the processor 4, in decreasing order of the numbers of the paths which can be just used when the shortest path between other node pair is calculated, calculates the shortest path between the node pair.

In addition, according to this embodiment, by using information of shortest path which has been already calculated, calculation time of other shortest path can be shortened.

In addition, when the numbers of nodes are compared, and there are nodes having the same number of downstream nodes, the path calculation unit 4*a* selects those nodes by predetermined order (for example, when node ID is represented by alphabet, the order is alphabet order of node ID). In the example of FIG. 9, about node D and node E having most and the same number of downstream nodes, node D which is earlier in alphabet order is selected.

In the above embodiment, each constitution shown in each figure is an example, the present invention is not limited to it.

What is claimed is:

1. A path calculation order determining method between groups of shortest paths to be calculated, the method executed by a calculating apparatus, for calculating a shortest path between a node pair in a network including a plurality of nodes, using information on calculated shortest paths between other node pairs, the method comprising:

a step of storing topology information on topology of nodes in the network in a memory medium included in the calculating apparatus;

a step of calculating a first group of the shortest paths each of which is a shortest path from a first starting node to a terminating node other than the first starting node from the topology information, and storing information on the first group of the shortest paths as the information on the calculated shortest paths in the memory medium included in the calculating apparatus; and a calculation step of selecting a second starting node from the information on the first group of the calculated shortest paths, and calculating a shortest path of the second group of shortest paths starting with the second starting node to a node which is other than the second starting node, the second starting node being on the first group of the calculated shortest paths and located one-hop downstream from the first starting node, and having the most nodes that are on the first group of the calculated shortest paths and located downstream from the second starting node, by using a path of the first group of the calculated shortest paths for a shortest path to a node that is included in the information on the first group of the calculated shortest paths, and by calculating a shortest path to a node that is not included in the information on the first group of the calculated shortest paths using the topology information, wherein the calculation step further comprises steps executed by the calculating apparatus of:

a search step of searching every node as a calculating starting node using information on the first or second group, or other group of the calculated shortest paths, the calculation starting node being on the calculated shortest paths and located one-hop downstream from the first or second starting node or a starting node included in the other group of the calculated shortest paths;

a selection step of selecting a node among the calculation starting nodes as a particular calculation starting node, the particular calculation starting node having the most nodes that are on the calculated shortest paths and located downstream from the particular calculation starting node;

a shortest path calculation step of calculating the second or the other group of shortest paths each starting from the particular calculation starting node and terminating at each of nodes other than the particular calculation starting node by using a shortest path starting from the selected particular calculation starting node and included in the calculated shortest paths for a shortest path to a node to be calculated when the node is included in the information on the calculated shortest paths; and by calculating a shortest path to a node using the topology information and a path algorithm when the node is not included in the information on the calculated shortest paths; and a repetition step of adding information of the shortest paths calculated using the topology information and the path algorithm into the information on the calculated shortest paths, and repeating the search step, the selection step, and the shortest path calculation step, until the calculation of every shortest path starting from each of the calculation starting nodes is over.

2. A system including a processor and a non-transitory computer readable medium storing topology information on topology of nodes in the network; program instructions including a step of calculating a first group of shortest paths each of which is a shortest path from a first starting node to a terminating node other than the first starting node from the topology information; and information on the first group of the shortest paths as information on calculated shortest paths, the instructions further comprising:

a calculation step of selecting a second starting node from the information on the first group of the calculated shortest paths, and calculating a shortest path of the second group of shortest paths starting with the second starting node to a node which is other than the second starting node, the second starting node being on the first group of the calculated shortest paths and located one-hop downstream from the first starting node, and having the most nodes that are on the first group of the calculated shortest paths and located downstream from the second starting node, by using a path of the first group of the calculated shortest paths for a shortest path to a node that is included in the information on the first group of the calculated shortest paths, and by calculating a shortest path to a node that is not included in the information on the first group of the calculated shortest paths using the topology information, wherein the calculation step further comprises steps executed by the calculating apparatus of:

a search step of searching every node as a calculation starting node using information on the first or second group, or other group of the calculated shortest paths, the calculation starting node bing on the calculated shortest paths and located one-hop downstream from the first or second starting node or a starting node included in the other group of the calculated shortest paths;

a selection step of selecting a node among the calculation starting nodes as a particular calculation starting node, the particular calculation starting node having the most nodes that are on the calculated shortest paths and located downstream from the particular calculation starting node;

a shortest path calculation step of calculating the second or the other group of shortest paths each starting from the particular calculation starting node and terminating at each of nodes other than the particular calculation starting node, by using a shortest path starting from the selected particular calculation starting node and included in the calculated shortest paths a shortest path to a node to be calculated when the node is included in the information on the calculated shortest paths; and by calculating a shortest path to a node using the topology information and a path algorithm when the node is not included in the information on the calculated shortest paths; and a repetition step of adding information on the shortest path calculated using the topology information and the path algorithm into the information on the calculated shortest paths, and repeating the search step, the selection step, and the shortest path calculation step, until the calculation of every shortest path starting from each of the calculation starting nodes is over.

3. A calculating apparatus calculating a shortest path between a node pair in a network including a plurality of nodes by using information on calculated shortest paths between other node pairs, the apparatus comprising:

a memory medium storing topology information on topology of nodes in the network; and a calculation unit calculating a first group of the shortest paths each of which is a shortest path from a first starting node to a terminating node other than the first starting node from the topology information, the memory medium also storing information on the first group of the shortest paths as the information on the calculated shortest paths, the calculation unit further executing a calculation step of selecting a second starting node from the information on the first group of the calculated shortest paths, and calculating a shortest path of the second group of shortest paths starting with the second starting node to a node which is other than the second starting node, the second starting node being on the first group of the calculated shortest paths and located one-hop downstream from the first starting node, and having the most nodes that are on the first group of the calculated shortest paths and located downstream from the second starting node by using a path starting from the second starting node and included in the first group of the calculated shortest paths for a shortest path to a node that is included in the information on the first group of the calculated shortest paths, and by calculating a shortest path to a node that is not included in the information on the first group of the calculated shortest paths using the topology information, wherein the calculation step further comprises:

a search step of searching every node as a calculation starting node using information on the first or second group, or other group of the calculated shortest paths, the calculation starting node being on the calculated shortest paths and located one-hop downstream from the first or second starting node or a starting node included in the other group of the calculated shortest paths;

a selection step of selecting a node among the calculation starting nodes as a particular calculation starting node, the particular calculation starting node having the most nodes that are on the calculated shortest paths and located downstream from the particular calculation starting node;

a shortest path calculation step of calculating the second or the other group of shortest paths each starting from the particular calculation starting node and terminating at each of nodes other than the particular calculation starting node, by using a shortest path starting from the selected particular calculation starting node and included the calculated shortest paths for a shortest path to a node to be calculated when the node is included in the information on the calculated shortest paths, and by calculating a shortest path to a node using the topology information and a path algorithm when the node is not included in the information on the calculated shortest paths; and a repetition step of adding information of the shortest paths calculated using the topology information and the path algorithm into the information on the calculated shortest paths, and repeating the searching of the search unit, the selecting of the selection unit, and the calculating by the shortest path calculation unit, until the calculation of every shortest path starting from each of the calculation starting nodes is over.

\* \* \* \* \*